J. MUCHKA.
SEPARATOR.
APPLICATION FILED JUNE 23, 1909.

960,374.

Patented June 7, 1910.

Witnesses:
M. H. Darg
L. A. Price

Inventor:
Josef Muchka,
by Wm. E. Boulter,
his Attorney.

ANDREW B. GRAHAM CO., PHOTO-LITHOGRAPHERS, WASHINGTON, D. C.

UNITED STATES PATENT OFFICE.

JOSEF MUCHKA, OF VIENNA, AUSTRIA-HUNGARY.

SEPARATOR.

960,374.  Specification of Letters Patent.  Patented June 7, 1910.

Application filed June 23, 1909. Serial No. 503,881.

*To all whom it may concern:*

Be it known that I, JOSEF MUCHKA, a subject of the Emperor of Austria-Hungary, and resident of Vienna, Austria-Hungary, have invented a certain new and useful Improvement in Separators, of which the following is a specification.

This invention relates to that class of apparatus for extracting oil from steam or for extracting water from gases and vapors in which the separation of the particles of liquid is effected by corner plates or corrugated plates and it has for its object by the special arrangement of the angles to enhance or increase to a great extent the separative action.

Figure 1:
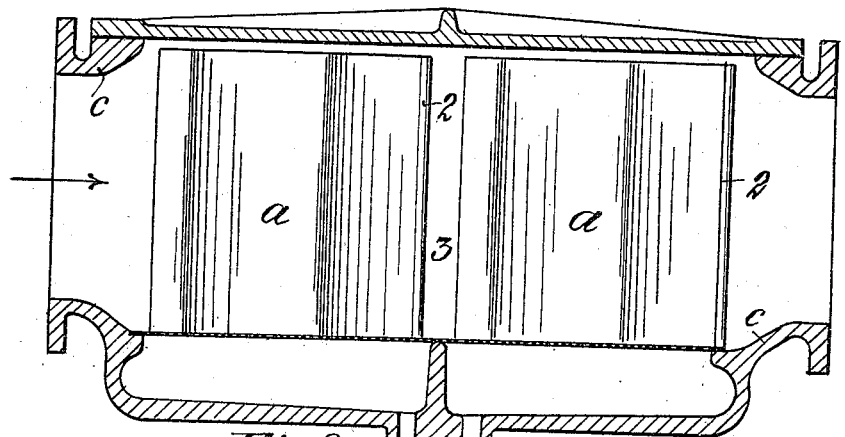
Figure 2:
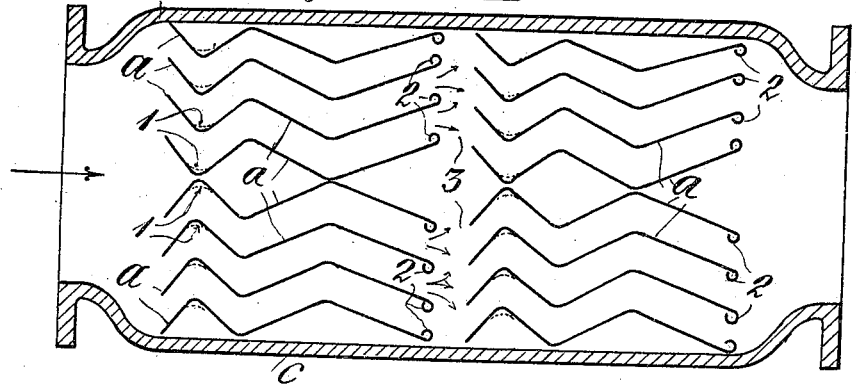
Figure 3:
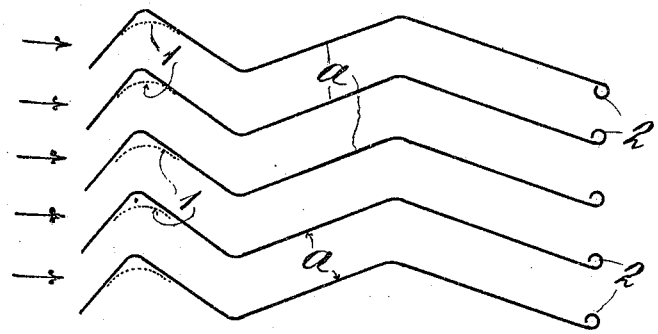

In the accompanying drawing which illustrates the invention Figure 1 is a longitudinal section and Fig. 2 a horizontal transverse section of one form of the oil separator containing the new arrangement and the novel construction of the corner plates, while Fig. 3 shows diagrammatically in plan to enlarged scale a number of such corner plate elements.

The corner corrugated plates $a$ according to the invention are so arranged that the angles which they inclose in the direction of flow continuously decrease from the inlet end to the outlet end so that the steam from which the oil is to be extracted or the gas to be desiccated on entering the apparatus passes almost at right angles to the faces of the angles, passing with each variation in direction into a compartment of greater cross section. This continuous increase of the cross section naturally requires a proportional alteration of the velocity of passage of the gases or the like so that the medium from which the oil or water is to be extracted remains longer in contact and over a greater separative surface. As the separation of the liquid is effected not only by adhesive action but also by centrifugal force this decreasing however with increasing radius of curvature, the throwing off of the particles of liquid especially near the inlet end hwere curves are sharpest is very efficient.

In order that the particles of liquid once thrown off may not be driven away or emulsified in the sharp angles of the inlet end, slotted plates or sieves 1 are inserted, through the openings in which the thrown off particles of liquid are forced into the quiet run-off zone lying behind this. The edges of the corner plate toward the outlet end are preferably turned inward not only to stiffen the plate but also in order to prevent the breaking up and throwing off of the already separated oil or water. It has a further advantage that the corrugations instead of requiring to be made in single pieces of the length of the whole apparatus are arranged in groups in the casing $c$ and are arranged both relatively to the longitudinal axis of the apparatus as also transversely thereto as shown in Fig. 2.

Relatively to the breadth of the apparatus (at right angles to the direction of flow of the medium) the corner plates are divided into only two groups lying symmetrically of the longitudinal axis and thus presenting opposite directions of corrugations while they are divided in the longitudinal direction (direction of flow) into separate sets between which are left vacant intermediate spaces 3. This special arrangement in groups of the corner plates has for its object a compulsory manifold separation of the current of gas or steam and in particular also to bring into action the outer parts (the parts near the sides) of the corner plates and to prevent the passage of the steam through the central part of the apparatus without special separating means as is the case in previously known arrangements of corner plates. The interruption of the angle faces in the longitudinal direction also prevents the passage of separate oil or water particles through the whole length of the apparatus as these must drop off at the interrupted points.

Having described my invention what I claim and desire to secure by Letters Patent of the United States is:—

1. Apparatus for extracting oil from steam or for extracting water from gases and vapors, comprising in combination with the casing, corner plates running from the inlet end to the outlet end of said casing and having angle faces arranged at an inclination to the direction of current and said plates being arranged so that the angles which they inclose in the direction of flow continually decreases from the inlet end to the outlet end, as and for the purpose set forth.

2. Apparatus for extracting oil from steam or for extracting water from gases and vapors, comprising in combination with the casing, corner plates running from the inlet end to the outlet end of said casing and having angle faces arranged at an inclination to the direction of current and said plates being arranged so that the angles which they inclose in the direction of flow continually decreases from the inlet end to the outlet end, and curved perforated plates arranged in the sharp angles of the inlet end on said corner plates, as and for the purpose set forth.

3. Apparatus for extracting oil from steam or for extracting water from gases and vapors, comprising in combination with the casing, corner plates running from the inlet end to the outlet end of said casing and having angle faces arranged at an inclination to the direction of current and said plates being arranged so that the angles which they inclose in the direction of flow continually decreases from the inlet end to the outlet end, curved perforated plates arranged in the sharp angles of the inlet end on said corner plates and turned in portions on said plates at said outlet end whereby the separate particles may be carried by the current on the convex side of said portions into a zone unaffected by the current as and for the purpose set forth.

4. Apparatus comprising in combination with the casing, corner plates arranged in groups in said casing said groups being arranged with opposite corrugations and running in the direction of the longitudinal axis and said plates being arranged so that the angles which they inclose in the direction of flow continually decreases from the inlet end to the outlet end, as and for the purpose set forth.

5. Apparatus comprising in combination with the casing, corner plates arranged in groups in said casing, said groups being arranged with opposite corrugations and running in the direction of the longitudinal axis and having angle faces separated in the direction of flow into groups said groups being arranged in series, and separated by intermediate spaces and said plates being arranged so that the angles which they inclose in the direction of flow continually decreases from the inlet end to the outlet end, as and for the purpose set forth.

In testimony whereof I have signed my name to this specification in the presence of two subscribing witnesses.

JOSEF MUCHKA.

Witnesses:
WILHELM BERGER,
ROBERT W. HEINGARTNER.